United States Patent
Pace et al.

(10) Patent No.: US 9,071,738 B2
(45) Date of Patent: Jun. 30, 2015

(54) INTEGRATED BROADCAST AND AUXILIARY CAMERA SYSTEM

(71) Applicants: Vincent Pace, Shadow Hills, CA (US); Patrick Campbell, Stevenson Ranch, CA (US)

(72) Inventors: Vincent Pace, Shadow Hills, CA (US); Patrick Campbell, Stevenson Ranch, CA (US)

(*) Notice: Subject to any disclaimer, the term of this patent is extended or adjusted under 35 U.S.C. 154(b) by 0 days.

(21) Appl. No.: 13/668,936

(22) Filed: Nov. 5, 2012

(65) Prior Publication Data

US 2013/0057697 A1 Mar. 7, 2013

Related U.S. Application Data

(63) Continuation-in-part of application No. 13/444,657, filed on Apr. 11, 2012, now Pat. No. 8,879,902, and a continuation-in-part of application No. PCT/US2010/059321, filed on Dec. 7, 2010, which is (Continued)

(51) Int. Cl.
| | |
|---|---|
| *G03B 35/00* | (2006.01) |
| *H04N 5/225* | (2006.01) |
| *H04N 5/247* | (2006.01) |
| *H04N 13/02* | (2006.01) |

(52) U.S. Cl.
CPC ............ *H04N 5/225* (2013.01); *H04N 5/247* (2013.01); *H04N 13/0239* (2013.01)

(58) Field of Classification Search
USPC ....................................................... 396/326
See application file for complete search history.

(56) References Cited

U.S. PATENT DOCUMENTS

| | | | |
|---|---|---|---|
| 4,751,570 A * | 6/1988 | Robinson | 348/47 |
| 5,465,128 A | 11/1995 | Wah Lo et al. | |
| 5,699,108 A | 12/1997 | Katayama et al. | |
| 5,737,655 A | 4/1998 | Inaba | |
| 5,801,760 A | 9/1998 | Uomori | |
| 5,974,272 A * | 10/1999 | Kiesow et al. | 396/140 |

(Continued)

FOREIGN PATENT DOCUMENTS

| | | |
|---|---|---|
| EP | 1085769 A2 | 3/2001 |
| GB | 2168565 A | 6/1986 |

(Continued)

OTHER PUBLICATIONS

European Patent Office, Supplementary European Search Report and Written Opinion for European Application No. 10823871.8, mail date Feb. 7, 2013.

(Continued)

*Primary Examiner* — Rochelle-Ann J Blackman
*Assistant Examiner* — Linda B Smith
(74) *Attorney, Agent, or Firm* — SoCal IP Law Group LLP; John E. Gunther; Steven C. Sereboff

(57) ABSTRACT

An integrated broadcast/auxiliary camera system includes a broadcast camera and an auxiliary camera. The broadcast camera may capture a first image of a scene, wherein operational parameters of the broadcast camera including a broadcast focus distance, a broadcast focal length, a broadcast pan angle and a broadcast tilt angle are operator controlled. The auxiliary camera may capture a second image of the scene, the second image different from the first image. A controller may automatically control operational parameters of the auxiliary camera including an auxiliary focus distance, an auxiliary focal length, an auxiliary pan angle and an auxiliary tilt angle based on the operational parameters of the broadcast camera.

14 Claims, 9 Drawing Sheets

Related U.S. Application Data a continuation of application No. 12/752,311, filed on Apr. 1, 2010, now Pat. No. 8,090,251, which is a continuation-in-part of application No. 12/578,171, filed on Oct. 13, 2009, now Pat. No. 7,929,852, application No. 13/668,936, which is a continuation-in-part of application No. 13/527,211, filed on Jun. 19, 2012.

(56) References Cited

U.S. PATENT DOCUMENTS

| | | | |
|---|---|---|---|
| 5,978,015 A | | 11/1999 | Ishibashi et al. |
| 6,160,607 A * | | 12/2000 | Diaconu ................ 352/140 |
| 6,388,666 B1 | | 5/2002 | Murray |
| 6,512,892 B1 | | 1/2003 | Montgomery et al. |
| 6,701,081 B1 | | 3/2004 | Dwyer et al. |
| 6,909,457 B1 | | 6/2005 | Fukasawa |
| 7,031,512 B2 | | 4/2006 | Ng |
| 7,218,342 B2 | | 5/2007 | Kobayashi et al. |
| 7,551,272 B2 | | 6/2009 | Vodanovic |
| 7,924,311 B2 * | | 4/2011 | Yoshida et al. ........... 348/159 |
| 8,121,471 B1 * | | 2/2012 | Gjokaj ................ 396/131 |
| 8,243,123 B1 * | | 8/2012 | Geshwind et al. ........... 348/42 |
| 8,390,729 B2 * | | 3/2013 | Long et al. ............... 348/345 |
| 8,462,209 B2 * | | 6/2013 | Sun .................... 348/144 |
| 8,473,549 B2 * | | 6/2013 | Drozt et al. ............... 709/204 |
| 2001/0056477 A1 | | 12/2001 | McTernan et al. |
| 2002/0012043 A1 | | 1/2002 | Guerin et al. |
| 2006/0017812 A1 * | | 1/2006 | Kogane et al. ........... 348/207.11 |
| 2007/0103675 A1 | | 5/2007 | Vodanovic |
| 2007/0247614 A1 | | 10/2007 | Puah et al. |
| 2008/0007567 A1 | | 1/2008 | Clatworthy et al. |
| 2008/0123938 A1 | | 5/2008 | Kim |
| 2008/0158345 A1 | | 7/2008 | Schklair |
| 2008/0199043 A1 * | | 8/2008 | Forsgren .................. 382/103 |
| 2009/0060273 A1 | | 3/2009 | Stephen et al. |
| 2009/0262184 A1 | | 10/2009 | Engle et al. |
| 2011/0128385 A1 * | | 6/2011 | Bedros et al. ........... 348/164 |
| 2011/0211096 A1 * | | 9/2011 | Aagaard et al. ........... 348/262 |

FOREIGN PATENT DOCUMENTS

| | | |
|---|---|---|
| JP | 3179438 A | 8/1991 |
| JP | 2004504631 A | 2/2004 |

OTHER PUBLICATIONS

Japan Patent Office, Notice of Reasons for Rejection for Japanese application No. 2012-534248, mail date Jan. 22, 2013.

World Intellectual Property Organization, International Search Report and Written Opinion for International Application No. PCT/US2010/052025, mail date Nov. 19, 2010.

Hurwitz, Matt, Dreaming in 3D, CineGear Expo News, The Official CineGear Expo Show Newspaper, Jun. 3-5, 2005, pp. 18-19.

21st Century3d.com, 21st Century 3D Introduces Uncompressed 4:4:4 Stereoscopic Camera System—3DVX3, SPIE Stereoscopic Displays and Applications Conference; avail. Http://www.21stcentury3d.com/press/pr-060117-3dvx3.html; printed Sep. 11, 2008, 3pp.

* cited by examiner

INTEGRATED BROADCAST AND AUXILIARY CAMERA SYSTEM

RELATED APPLICATION INFORMATION

This patent is a continuation-in-part of patent application Ser. No. 13/444,657. entitled INTEGRATED 2D/3D CAMERA WITH FIXED IMAGE FRAMING, filed Apr. 11, 2012, which is a continuation-in-part of International Application No. PCT/US2010/52025, entitled INTEGRATED 2D/3D CAMERA, filed Oct. 8, 2010, which claims priority from patent application Ser. No. 12/578,171, entitled INTEGRATED 2D/3D CAMERA, filed Oct. 13, 2009, now U.S. Pat. No. 7,929,852 B1. This patent is a continuation-in-part of International Application No. PCT/US2010/59321, entitled FRAME LINKED 2D/3D CAMERA SYSTEM, filed Dec. 7, 2010, which claims priority to patent application Ser. No. 12/752,311, entitled FRAME LINKED 2D/3D CAMERA SYSTEM, filed Apr. 1, 2010, now U.S. Pat. No. 8,090,251 B2, which is a continuation-in-part of patent application Ser. No. 12/578,171. This patent is a continuation-in-part of patent application Ser. No. 13/527,211, entitled ROBOTIC CAMERA WITH CONTEXT DISPLAY, filed Jun. 19, 2012.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to camera systems for broadcasting live events.

2. Description of the Related Art

Live events, such as sporting events, theatrical productions, and concerts, may be captured using a plurality of video cameras. In this context "captured" means to convert a visual scene into video data for broadcasting and/or recording. For example, the broadcast of the 2012 Super Bowl reportedly used 40 cameras to capture the actual game and another 17 cameras to capture the pre- and post-game shows. The total effort reportedly required 29 trucks and trailers of equipment, six miles of cables, and a crew of 475 people.

The plurality of cameras used to capture an event may include high definition and/or standard definition broadcast cameras. The plurality of cameras used to capture an event may also include specialty cameras. For example, the cameras employed at the 2012 Super Bowl reportedly included four high speed cameras. The images captured by the high speed cameras were recorded and subsequently played back at normal speed to provide slow motion instant replay. While the 2012 Super Bowl was not captured in 3D (3-dimensions), other events have been captured using both conventional cameras and 3D, or stereoscopic, cameras.

The cost and complexity of capturing live events may be reduced if a single camera operator controls more than one camera. For example U.S. Pat. No. 7,929,852 B1 and U.S. Pat. No. 8,090,251 B2 describe camera systems that allow a single camera operator to control both 2D and 3D cameras to capture 2D and 3D images of the same, or nearly the same, scene.

Throughout this description, elements appearing in schematic views and block diagrams are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
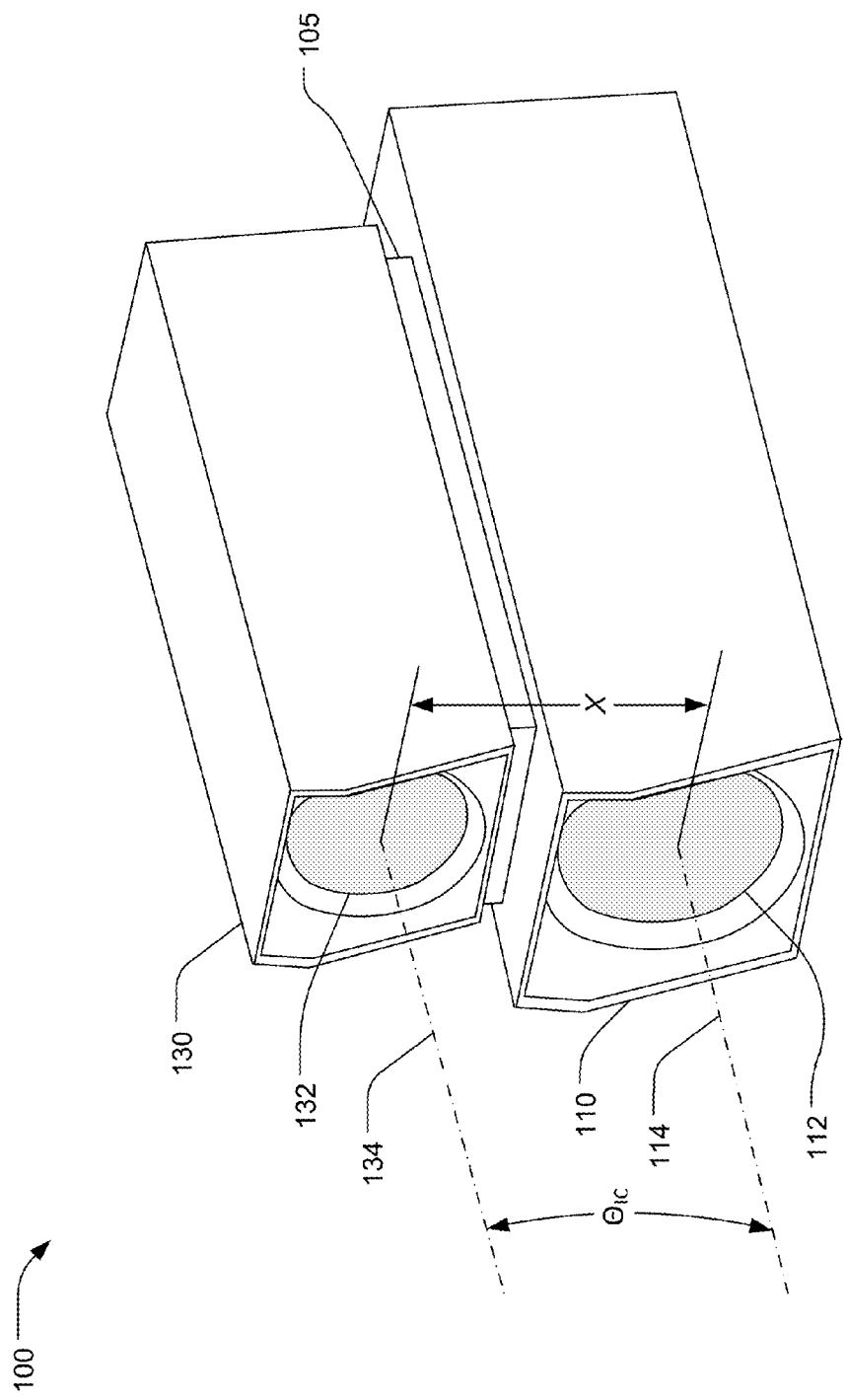
FIG. 1 is a perspective schematic view of an integrated broadcast and auxiliary camera system.

Referring now to FIG. 1, an integrated broadcast/auxiliary camera system 100 may include an auxiliary camera 130 affixed, or attached physically, to a broadcast camera 110. The broadcast camera 110 may include a lens 112. Similarly, the auxiliary camera 130 may include a lens 132. The term "lens" is intended to include any image-forming optical system and is not limited to combinations of transparent refractive optical elements. A lens may use refractive, diffractive, and/or reflective optical elements and combinations thereof. Within each of the broadcast camera 110 and the auxiliary camera 130, the respective lens may form an optical image of a portion of the scene on a respective detector that converts the optical image into a data stream. In this context, the term "data stream" includes analog signals and digital data. The process of forming an optical image of the scene and converting the optical image into video data will be referred to herein as "capturing an image" of the scene. The portion of the scene that is captured by a camera will be referred to as the "field of view" of the camera.

Each lens 112, 132 may have a respective optical axis 114, 134 that defines the center of the field of view of each camera 110, 130. In FIG. 1, the auxiliary camera 130 is disposed on top of the broadcast camera 110. Other configurations, for example with an auxiliary camera below or alongside a broadcast camera, are possible. Configurations where an auxiliary camera is proximate to, but not attached to, a broadcast camera are also possible.

In this patent, a "broadcast camera" is a video camera that captures an image of a scene and provides video data that conforms, or may be easily processed to conform, to a standard used for video recording and/or broadcasting. The broadcast camera 110 may provide standard definition video data in compliance with a standard such as the NTSC (National Television System Committee) 525-line video standard in the U.S. or a 625-line PAL (Phase Alternating Line) or SECAM (Séquentiel Couleur à Mémoire) video standard in other countries. The broadcast camera 110 may provide a high definition video data such as 720p, 1080i, or 1080p video data or some other present or future standard digital or analog video data format.

In this patent, an "auxiliary camera", such as the auxiliary camera 130, is a video camera that views generally the same scene viewed by a broadcast camera, but captures a different image of the scene. The image captured by the auxiliary camera may differ from the image captured by the broadcast camera in resolution, frame rate, field of view, format, or some other manner. In this context, the term "auxiliary" means both "functioning in a subsidiary capacity" and "augmenting or available to augment a basic capability".

The operation of the auxiliary camera 130 may be subsidiary to the operation of the broadcast camera 110. Specifically, some or all of the operational parameters of the auxiliary camera 130 may be dictated by the operation of the broadcast camera 110. For example, the focus distance of the broadcast camera lens 112 may be set by an operator to focus on a particular scene object. The focus distance of the auxiliary camera lens 132 may be automatically set to focus on the same scene object. The focal length or zoom of the broadcast camera lens 112 may be set by the operator and the focal length of the auxiliary camera lens 132 may be set based on the focal length of the broadcast camera lens 112. For example, the focal length of the auxiliary camera lens 132 may be set to be proportional, but not necessarily equal, to the focal length of the broadcast camera lens 112.

The auxiliary camera 130 may augment the broadcast camera 110 by capturing image information that is not captured by the broadcast camera. For example, the broadcast camera 110 may be a conventional, two-dimensional (2D) camera and the auxiliary camera 130 may be a stereoscopic or three dimensional (3D) camera. The 2D and 3D cameras may be coupled as described in No. U.S. Pat. No. 7,929,852 B1 or U.S. Pat. No. 8,090,251 B2 and may be operated by a single camera operator.

For further example, the broadcast camera 110 may be a 2D camera and the auxiliary camera 130 may be a 2D camera that captures an image in a format that cannot or will not be broadcast directly. The video data from the auxiliary camera 130 may be stored and subsequently "replayed" to broadcast a portion of an event with different image content than originally broadcast. To replay the video data from the auxiliary camera, a portion of the stored video data may be retrieved, appropriately processed, and broadcast. The video data from both the broadcast camera 110 and the auxiliary camera 130 may be stored and subsequently used to create an archival, documentary, or theatrical show different from the live broadcast of the event.

The auxiliary camera 130 may be a high speed camera to capture a scene using a very high frame rate. For example, the auxiliary camera 130 may be a HI MOTION camera from NAC Image Technology or a PHANTOM camera from Vision Research or some other high speed camera. The high speed camera may capture a scene at 1000 frames per second or higher with resolution comparable to that of high definition television. The video from the high speed auxiliary camera may be stored and then broadcast at a conventional frame rate to provide smooth slow motion replay.

The auxiliary camera 130 may be a high resolution video camera that captures substantially more information about a scene than is captured by the broadcast camera 110, but in a format that cannot be directly broadcast. For example, the auxiliary camera 130 may be a RED EPIC video camera with a resolution of 2700×5120 picture elements. The video from a high resolution auxiliary camera may be stored. Digital pan and zoom techniques may be used to select a portion of the stored images to replay a portion of a scene at higher resolution than can be obtained by digitally zooming into the image captured by the broadcast camera.

The auxiliary camera 130 may be a very high resolution still camera that captures substantially more information about a scene than is captured by the broadcast camera 110, but at a much lower frame rate. For example, the auxiliary camera 130 may be a Nikon D4 camera to capture up to ten 16.2 megapixel images per second, a Nikon D3X camera to capture up to five 24.5 megapixel images per second, or a Phase One camera with an IQ Digital Back to capture up to one 60 megapixel image per second The auxiliary camera 130 may be one of many other digital still cameras from these and other manufacturers. In any case, suitable mechanisms may be added to the still camera to allow automatic control of focus distance, focal length, and aperture. The images from a very high resolution still camera may be stored and subsequently used, for example, in print media or graphic arts.

The auxiliary camera 130 may be a light field or plenoptic camera that captures information about light rays emanating from a scene and allows the scene to be reconstructed with the apparent focus plane set at any depth within the scene. Information from a light field auxiliary camera may be stored and used to replay a scene with a different portion of the scene in focus.

The auxiliary camera 130 and the broadcast camera 110 may capture different portions of the scene using the same image format. For example, the auxiliary camera 130 may have a substantially wider field of view than the broadcast camera 110, and both the auxiliary camera 130 and the broadcast camera 110 may output video data using the same format, such as 1080i or 1080p high definition television format. In this case, the camera used by the operator to frame the scene (i.e. the camera that feeds the operator's monitor display) is considered the "broadcast camera" and the other camera is by definition the auxiliary camera.

The optical axis 114 of the broadcast camera 110 and the optical axis 134 of the auxiliary camera 130 may be separated, at the lenses 112, 132, by an inter-camera distance X. If the broadcast camera 110 and the auxiliary camera 130 are disposed such that the optical axes 114 and 134 are parallel, the centers of images captured by the broadcast camera 110 and the auxiliary camera 130 will be offset by the same amount. The broadcast camera 110 and the auxiliary camera 130 may be disposed such that an inter-camera convergence angle $\Theta_{IC}$ is formed between the respective optical axes 114 and 134. In this case, the optical axes 114 and 134 may converge or intersect at an inter-camera convergence distance from the integrated broadcast/auxiliary camera system 100. The integrated broadcast/auxiliary camera system 100 may include an inter-camera convergence mechanism 105 to control the inter-camera convergence angle $\Theta_{IC}$ to cause the optical axes 114, 134 to intersect at a desired inter-camera convergence distance. The desired inter-camera convergence distance may typically be equal to the focus distance of the lenses 112, 132. The inter-camera convergence mechanism 105 may effectively adjust the pan angle and/or the tilt angle of the auxiliary camera 130 to be slightly different than the pan and/or tilt angles of the broadcast camera 110.

Figure 2:
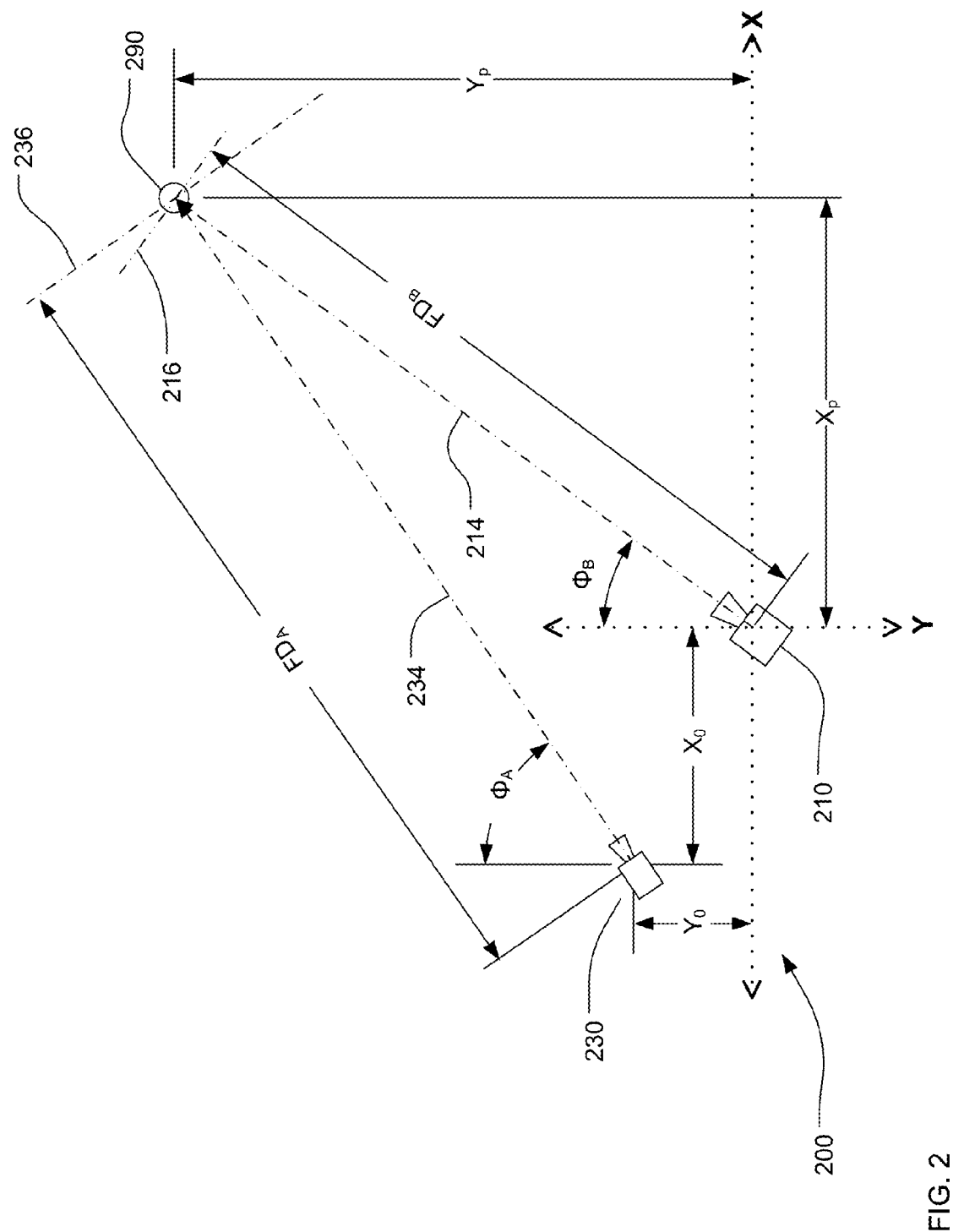
FIG. 2 is a schematic top view of integrated broadcast and auxiliary cameras in a venue.

Referring now to FIG. 2, an integrated broadcast/auxiliary camera system 200 may include a broadcast camera 210 and a physically separate auxiliary camera 230. The broadcast camera 210 and the auxiliary camera 230 may capture different images of the same, or nearly the same scene, as previously described with respect to the broadcast and auxiliary cameras 110, 130. The broadcast camera 210 and the auxiliary camera 230 may be separated by a distance $X_0$ along an X axis, and by a distance $Y_0$ along a Y axis orthogonal to the X axis. The broadcast camera 210 and the auxiliary camera 230 may also be physically separated by a distance $Z_0$ (not visible in FIG. 2) along a Z axis normal to the plane of FIG. 2. The broadcast camera 210 and the auxiliary camera 230 may be coupled in a master-slave relationship such that the auxiliary camera 230 is automatically operated such that both cameras point at and focus upon the same primary scene object.

The broadcast camera 210 may be oriented such that an optical axis 214 of the broadcast camera 210 is directed at a portion of the scene to be captured. The orientation of the broadcast camera 210 may be defined by a pan angle $\Phi_B$, which is defined in this example as the angle between the optical axis 214 of the broadcast camera 210 and the Y axis, and by a tilt angle $T_B$ (not visible in FIG. 2) which is defined as the angle between the optical axis 214 and the plane of FIG. 2.

The focus distance of a lens may be defined as the distance along the optical axis from a lens to the focus plane of the lens. Although the term "focus plane" is commonly used, the "focus plane" may be slightly non-planar due to lens aberrations. The focus plane 216 of the broadcast camera 210 may be located at a focus distance $FD_B$ from the broadcast camera 210. An intersection of the optical axis 214 and focus plane 216 of the broadcast camera will commonly be coincident with or near a primary subject of the scene to be captured by the broadcast camera. The primary subject may be, for example, a particular athlete or actor. The intersection of the optical axis 214 and focus plane 216 of the broadcast camera will be referred to herein as the "primary scene object" 290 (whether or not an object is actually present at that location).

The auxiliary camera 230 may be automatically operated such that an optical axis 234 of the auxiliary camera is also directed at the primary scene object 290. Additionally, the auxiliary camera 230 may be automatically operated such that the primary scene object 290 lies in or near the focal plane 236 of the auxiliary camera lens.

The intersection of the focal plane 216 and the focal plane 236 forms a line normal to the plane of FIG. 2. If the automatic operation of the auxiliary camera 230 achieves perfection, the line formed by the intersection of the focal planes 216 and 236 would pass through the intersection point of the optical axes 214, 234. However, perfection is not required, so long as the broadcast camera lens and the auxiliary camera lens are approximately focused on the same scene object. In this context, a lens is "approximately focused" on a scene object lies if an offset between the scene object and the focus plane of the lens is small compared to the depth of focus of the lens.

The location of the primary scene object 290 with respect to the broadcast camera 210 may be determined from the pan angle $\Phi_B$, the tilt angle $T_B$, and the focus distance $FD_B$. Specifically, defining the location of the broadcast camera 210 to be the origin of a rectangular coordinate system, the position of the primary scene object 290 may be defined by $X_p$, $Y_p$, and 4 coordinates (where Z is normal to the plane of FIG. 2 and thus not visible in FIG. 2), where:

$$X_p = FD_B \cos(T_B)\sin(\Phi_B); \quad (3)$$

$$Y_p = FD_B \cos(T_B)\cos(\Phi_B); \text{ and} \quad (4)$$

$$Z_p = FD_B \sin(T_B). \quad (5)$$

The required pan angle $\Phi_A$, the tilt angle $T_A$, and the focus distance $FD_A$ of the auxiliary camera 230 may then be determined based on the coordinates $X_p$, $Y_p$, $Z_p$ of the primary scene object and the known position $X_0$, $Y_0$, $Z_0$ of the auxiliary camera 230 relative to the broadcast camera 210. Specifically, equations (6), (7), and (8) define the required pan angle $\Phi_A$, tilt angle $T_A$, and focus distance $FD_A$ such that the center of the image frame captured by the auxiliary camera 230 will be coincident with the center of the image frame captured by the broadcast camera 210:

$$\Phi_A = \tan^{-1}\left[\frac{X - X_0}{Y - Y_0}\right] \quad (6)$$

$$T_A = \sin^{-1}\left[\frac{Z - Z_0}{FD_A}\right] \quad (7)$$

$$FD_A = \sqrt{(X - X_0)^2 + (Y - Y_0)^2 + (Z - Z_0)^2} \quad (8)$$

The use of an X-Y-Z rectangular coordinate system to describe the locations of the broadcast camera 210, the auxiliary camera 230, and the primary scene object 290 is exemplary. A different coordinate system, such as a polar coordinate system, could be used, and equations analogous to equations (3)-(8) may be derived for use in the alternative coordinate system. In any case, the control of $FD_A$ may be consistent with equation (8) even if a different set of equations are used.

The broadcast camera 210 and the auxiliary camera 230 may include zoom lenses, or lenses with adjustable focal length. Adjusting the focal length of a camera lens changes the size of the image frame, or field of view, captured by the camera. Setting the size and location of the image frame is commonly referred to as "framing" the image or shot. A focal length of the lens in the broadcast camera 210 may be set by the camera operator to provide a desired framing of a primary scene object. In the integrated broadcast/auxiliary camera system 200, a focal length for the lens or lenses in the auxiliary camera 230 may be determined, at least in part, from the focal length of the broadcast camera lens. For example, the focal length of the auxiliary camera lens may be set proportional to, but not necessarily equal to, the focal length of the broadcast camera lens.

It can be understood that the integrated broadcast/auxiliary camera system 100 of FIG. 1 is a specialized case of the integrated broadcast/auxiliary camera system 200 of FIG. 2. In the integrated broadcast/auxiliary camera system 100, the inter-camera distance X is very small compared to the distance from the cameras to the primary scene object. In this case, equation (8) can be simplified to $FD_A = FD_B$. In both the integrated broadcast/auxiliary camera system 100 and the integrated broadcast/auxiliary camera system 200, the auxiliary camera is automatically operated such that both the broadcast camera and the auxiliary camera are focused upon the same primary scene object and the optical axes of the two cameras intersect at the primary scene object.

Figure 3:
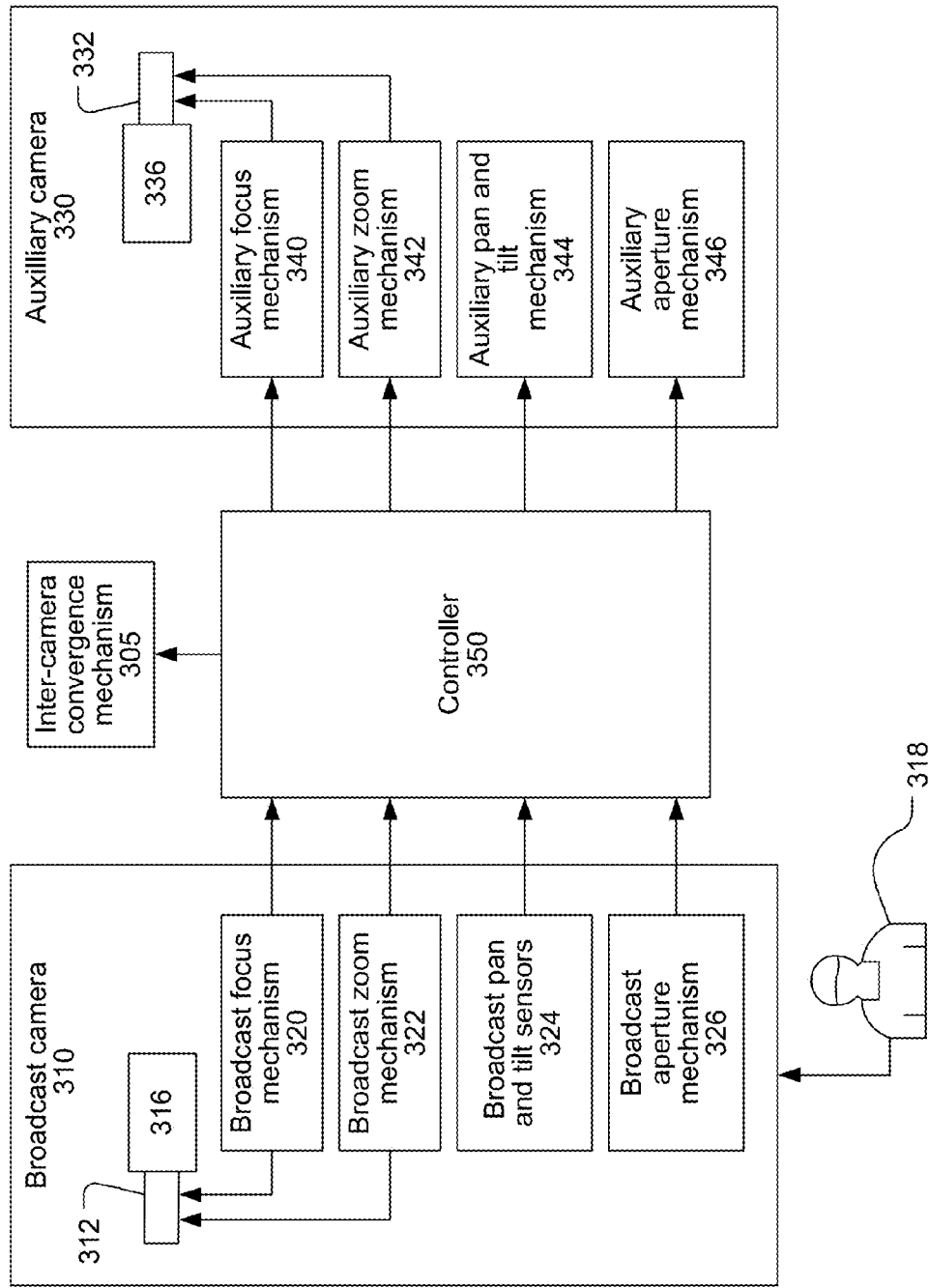
FIG. 3 is a block diagram of an integrated broadcast and auxiliary camera system.

Referring now to FIG. 3, an integrated broadcast/auxiliary camera system 300, which may be the integrated broadcast/ auxiliary camera system 100 or 200, may include a broadcast camera 310 and an auxiliary camera 330 as previously defined, and a controller 350. All or portions of the controller 350 may be integrated with or remote from the broadcast camera 310 and/or the auxiliary camera 330.

The broadcast camera 310 may include a camera head 316 and a lens 312. For ease of discussion, the focus distance, the focal length, and the aperture of the lens 312 of the broadcast camera 310 will be referred to as the "broadcast focus distance", the "broadcast focal length", and the "broadcast aperture" respectively. The corresponding parameters of the auxiliary camera will be referred to as the "auxiliary focus distance", the "auxiliary focal length", and the "auxiliary aperture". The broadcast camera 310 may include a broadcast focus mechanism 320 and a broadcast zoom mechanism 322 for setting the broadcast focus distance and the broadcast focal length, respectively. The broadcast focus mechanism 320 and the broadcast zoom mechanism 322 may be controlled directly or indirectly by the operator 318. The broadcast focus mechanism 320 and the broadcast zoom mechanism 322 may include sensors to send data representative of the broadcast focus distance and the broadcast focal length to the controller 350.

The auxiliary camera 330 may include a camera head 336 and a lens 332. The auxiliary camera 330 may include an auxiliary focus mechanism 340 and an auxiliary zoom mechanism 342 for setting the auxiliary focus distance and the auxiliary focal length, respectively. The auxiliary focus mechanism 340 and the auxiliary zoom mechanism 342 may be controlled by the controller 350 based on the broadcast focus distance and the broadcast focal length set by the operator 318.

The auxiliary camera 330 may be physically attached to the broadcast camera 310, as shown in FIG. 1. In this case, the auxiliary camera 330 and the broadcast camera 310 may be mounted on a common pan and tilt platform and the broadcast pan and tilt sensors 324 and the auxiliary pan and tilt mechanism 344 may not be present. The controller 350 may cause the auxiliary focus mechanism 340 to set the auxiliary focus distance equal to the broadcast focus distance. The controller 350 may cause the auxiliary zoom mechanism 342 to set the auxiliary focal length based on the broadcast focal length. For example, the controller 350 may cause the auxiliary zoom mechanism 342 to set the auxiliary focal length equal to or proportional to the broadcast focal length.

When the auxiliary camera 330 is physically attached to the broadcast camera 310, the integrated broadcast/auxiliary camera system 300 may include an inter-camera convergence mechanism 305. The inter-camera convergence mechanism 305 may be configured to ensure the images captured by the broadcast camera 310 and the auxiliary camera 330 are centered on the same point within the scene. The inter-camera convergence mechanism 305 may include one or more movable platforms or stages coupled to motors or other actuators to set the inter-camera convergence angle in response to data received from the controller 350. The controller 350 may cause the inter-camera convergence mechanism 305 to set a convergence angle between the optical axes of the broadcast camera 310 and the auxiliary camera 330 such that the optical axes intersect at a distance equal to the broadcast focus distance and the auxiliary focus distance.

The auxiliary camera 330 and the broadcast camera 310 may be mounted separately, as shown in FIG. 2. In this case, the broadcast camera 310 may be mounted on an operator-controlled pan and tilt platform. The broadcast camera 310 may include pan and tilt sensors 324 to sense the pan and tilt angles set by the operator 318. The auxiliary camera 330 may include a pan and tilt mechanism 344 to set the pan and tilt angles of the auxiliary camera 330. The controller 350 may cause the pan and tilt angles of the auxiliary camera 330 to be set based on the outputs from the pan and tilt sensors 324 and equations (6) and (7) or analogous equations for a different coordinate system.

When the auxiliary camera 330 and the broadcast camera 310 are mounted separately, the controller 350 may cause the auxiliary focus mechanism 340 to set the auxiliary focus distance based on the broadcast focus distance using equation (8), or an analogous equation for a different coordinate system. The controller 350 may cause the auxiliary zoom mechanism 342 to set the auxiliary focal length based on the broadcast focal length. For example, the controller 350 may cause the auxiliary zoom mechanism 342 to set the auxiliary focal length equal to or proportional to the broadcast focal length.

The broadcast camera 310 may include a broadcast aperture mechanism 326 to adjust the broadcast aperture. The broadcast aperture may be controlled by the operator 318. The broadcast aperture may be set automatically, for example, based on a light meter internal or external to the broadcast camera or based on analysis of the image captured by the broadcast camera. When the broadcast aperture is controlled by the operator 318, the broadcast aperture mechanism may send data representative of the broadcast aperture to the controller 350. The auxiliary camera 330 may include an auxiliary aperture mechanism 346. The auxiliary aperture mechanism 346 may be controlled by the controller 350 based on the operator setting of the broadcast aperture. The auxiliary aperture mechanism 346 may be controlled automatically, for example based on a light meter internal or external to the auxiliary camera 330 or based on analysis of the image captured by the auxiliary camera 330.

Figure 4:
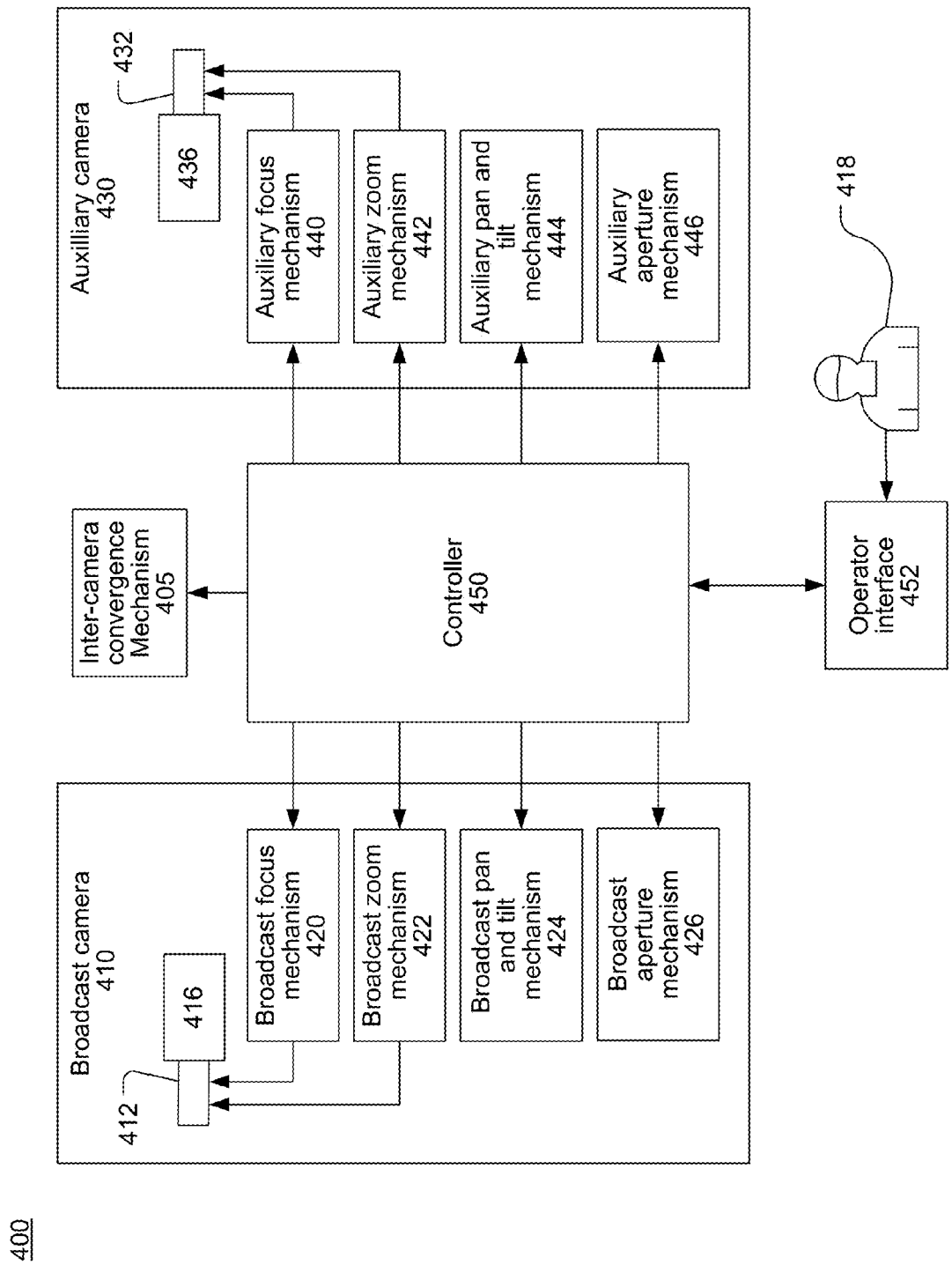
FIG. 4 is a block diagram of another integrated broadcast and auxiliary camera system.

Referring now to FIG. 4, an integrated broadcast/auxiliary camera system 400, which may be the integrated broadcast/auxiliary camera system 100 or 200, may include a broadcast camera 410, an auxiliary camera 430, and a controller 450. The broadcast camera 410 and the auxiliary camera 430 may include respective camera heads 416 and 436, and respective lenses 412 and 432. The integrated broadcast/auxiliary camera system 400 is similar to the integrated broadcast/auxiliary camera system 300, except that the operator 418 is located remote from the broadcast camera 410 and the auxiliary camera 430. Descriptions of elements of the integrated broadcast/auxiliary camera system 400 that have the same function as the counterpart elements of the integrated broadcast/auxiliary camera system 300 will not be repeated in detail.

The operator 418 may control the broadcast camera 410 and the auxiliary camera 430 via an operator interface 452. The operator interface 452 may include a display (not shown) presenting the video information captured by the broadcast camera 410. The operator interface 452 may provide controls for the operator to input settings for parameters of the broadcast camera 410 including broadcast focus distance, broadcast focal length, broadcast aperture, and the pan and tilt angles of the broadcast camera 410. The settings input by the operator 418 may be conveyed to the controller 450. All or portions of the controller 450 may be integrated with or remote from the broadcast camera 410, the auxiliary camera 430, and or the operator interface 452.

The controller 450 may cause a broadcast focus mechanism 420, a broadcast zoom mechanism 422, a broadcast pan and tilt mechanism 424, and a broadcast aperture mechanism 426 to set the respective parameters of the broadcast camera 410 in accordance with the operator inputs. The controller 450 may also cause operating parameters of the auxiliary camera to be set in accordance with the same operator inputs.

The auxiliary camera 430 and the broadcast camera 410 may be collocated and mounted on a common pan and tilt mechanism (assumed to be the broadcast pan and tilt mechanism in this description). In this case, the auxiliary pan and tilt mechanism 444 will not be present. The controller 450 may cause an auxiliary focus mechanism 440 to set an auxiliary focus distance equal to the broadcast focus distance, and may cause an auxiliary zoom mechanism to set an auxiliary focal length based on the broadcast focal length. The controller 450 may also control an inter-camera convergence mechanism 405 to set an inter-camera convergence distance equal to the broadcast focus distance.

The auxiliary camera 430 and the broadcast camera 410 may be mounted separately, as shown in FIG. 2. In this case, the broadcast camera 410 may include a broadcast pan and tilt mechanism 424 that is controlled by the operator 418 via the operator interface 452 and the controller 450. The auxiliary camera 430 may include a pan and tilt mechanism 444 to set the pan and tilt angles of the auxiliary camera 430. The controller 450 may cause the pan and tilt angles of the auxiliary camera 430 to be set based on the pan and tilt angles of the broadcast camera 410 and equations (6) and (7) or analogous equations for a different coordinate system the produce results consistent with equations (6) and (7).

When the auxiliary camera 430 and the broadcast camera 410 are mounted separately, the controller 450 may cause the auxiliary focus mechanism 440 to set the auxiliary focus distance based on the broadcast focus distance using equation (8) or another equation that produces a result consistent with equation (8). The controller 450 may cause the auxiliary zoom mechanism 442 to set the auxiliary focal length based on the broadcast focal length. For example, the controller 450 may cause the auxiliary zoom mechanism 442 to set the auxiliary focal length equal to or proportional to the broadcast focal length.

Figure 5:
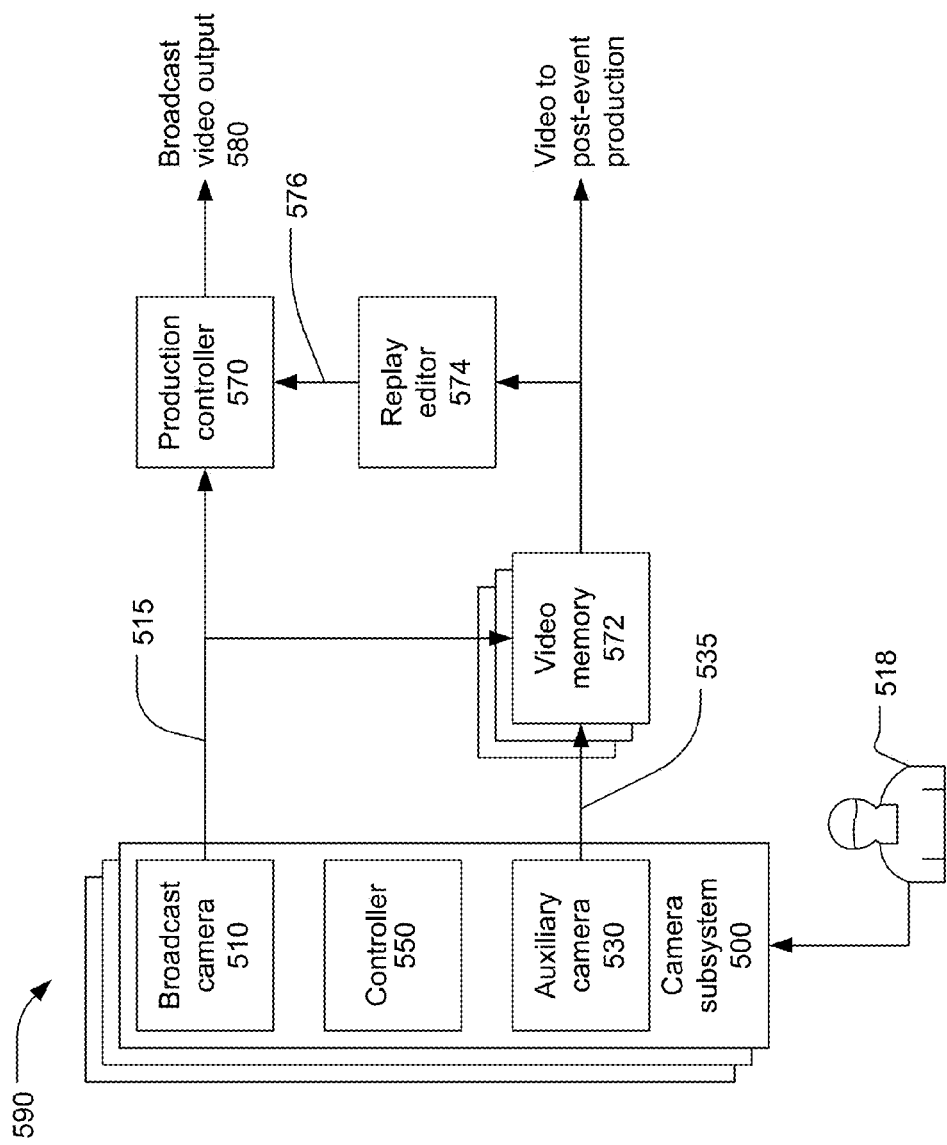
FIG. 5 is a block diagram of another integrated broadcast and auxiliary camera system.

Referring now to FIG. 5, a system 590 for broadcasting a live event may include one or more integrated broadcast/auxiliary camera system 500, a production controller 570, a video memory 572, and a replay editor 574. The system 590 may include one or more stand-alone cameras (i.e. cameras other than integrated broadcast/auxiliary camera systems) that are not shown in FIG. 5. Each integrated broadcast/auxiliary camera system 500 may be controlled by a respective operator 518. Each integrated broadcast/auxiliary camera system 500 may include a broadcast camera 510, an auxiliary camera 530, and a controller 550. Each integrated broadcast/auxiliary camera system 500 may be the integrated broadcast/auxiliary camera system 300 or 400.

The video data 515 from the broadcast camera 510 may be provided to the production controller 570 along with video data from all other broadcast and stand-alone cameras. The production controller may include equipment to allow one or more operators to select, edit, and manage the video data from the camera to provide a broadcast video output 580. The production controller 570 may include a video switcher to select video data from one of the cameras or video data 576 from the replay editor 574 to output as the broadcast video output 580. The production controller may include other equipment such as an audio mixer, monitors to display the video images captured by all or a selectable subset of the cameras, a digital effects editor, an overlay generator to provide text and graphics overlaid over video data in the broadcast video output 580, and equipment to maintain synchronization between the cameras and other equipment. At least the control panels for the various production controller functions may be located in a production control room. The production control room may be disposed in a permanent location (e.g. adjacent to a production studio) or housed in a trailer or truck for portability. The equipment that performs the various functions may be located within or external to the production control room.

The video data 535 from the auxiliary camera 530 may be stored in the video memory 572. The video memory 572 may be configured to store video data from some or all of the auxiliary cameras, some or all of the broadcast cameras, and some or all of the stand alone cameras in the system 590. The video memory 572 may include a plurality of storage devices, each of which may store video data from one or more cameras. The video memory 572 may include fast-access storage devices such as solid state memory and/or video disc storage devices for short-term storage of video data that may be used for "instant replay" of portions of an event. The video memory 572 may include slow-access storage devices such as analog or digital tape storage devices for long-term storage of video data for post-event applications. The video data 535 from the auxiliary camera 530 may be stored on either or both a fast-access storage device and a slow-access storage device. The video data 535 from the auxiliary camera 530 may be initially stored on a fast-access storage device and some or all of the stored video data may subsequently be moved to a slow-access storage device.

Typically, the video data 535 from the auxiliary camera 530 is not incorporated into the broadcast video output 580 without first being stored in the video memory 572 and subjected to additional processing by the replay editor 574. The video data 535 may be displayed in real time in anticipation of its subsequent processing by the replay editor.

The replay editor 574 may include equipment to allow one or more operators to retrieve selected video data from the video memory 572 and provide the processed video data to the production controller for inclusion in the broadcast video output. Retrieved video data may be selectively processed. Processes that may be performed include, for example, replaying stored video data at a different frame rate to provide slow motion, applying digital pan and zoom techniques to replay a portion of an event at a higher level of detail, and combining video data from multiple cameras into a split-screen image.

Figure 6:
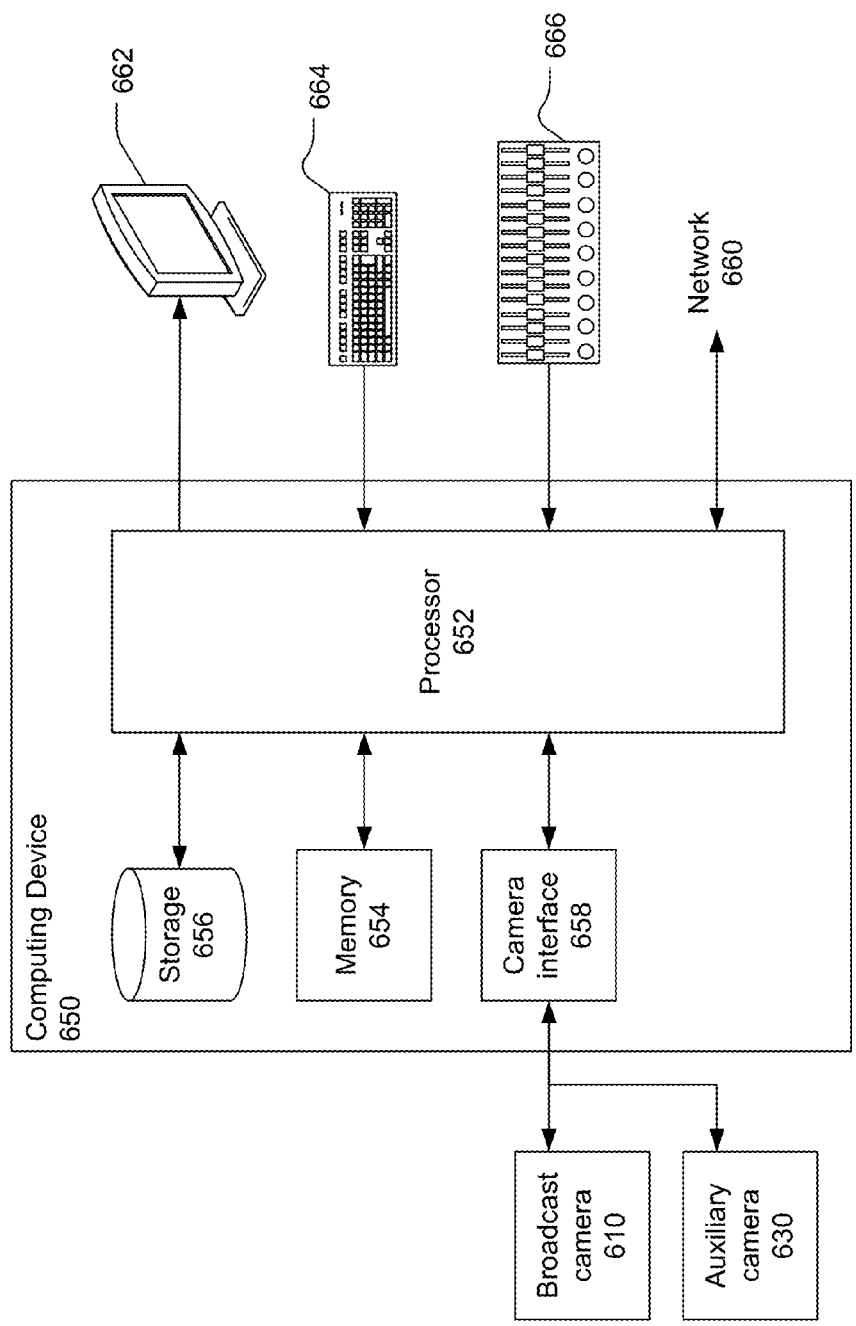
FIG. 6 is a block diagram of a computing device.

FIG. 6 is a block diagram of a computing device 650 that may be suitable for the controller 350 or the controller 450. As used herein, a computing device refers to any device with a processor, memory and a storage device that may execute instructions including, but not limited to, personal computers, server computers, computing tablets, portable computers, and laptop computers. The computing device 650 may include hardware, firmware, and/or software adapted to perform the processes subsequently described herein. The computing device may include a processor 652 coupled to a memory 654 and a storage device 656.

The storage device 656 may store instructions which, when executed by the computing device 650, cause the computing device 650 to provide the features and functionality of the controller 350 or 450. As used herein, a storage device is a device that allows for reading from and/or writing to a storage medium. Storage devices include hard disk drives, DVD drives, flash memory devices, and others. Storage media include, for example, magnetic media such as hard disks, floppy disks and tape; optical media such as compact disks (CD-ROM and CD-RW) and digital versatile disks (DVD and DVD±RW); flash memory cards; and other storage media. The term "storage medium" means a physical object for storing data does not encompass transitory media such as signals and propagating waveforms.

The computing device 650 may include or interface with a display device 662 and one or more input devices such a keyboard 664. The computing device 650 may also include or interface with a control panel 666 having controls for an operator to set camera operating parameters such as pan and tilt angles, focus distance, focal length, and aperture. The computing device 650 may interface with one or more networks 660. The network 660 may be or include the Internet or any other private or public network.

The computing device 650 may include or be coupled to a camera interface unit 658 to interface with a broadcast camera 610 and an auxiliary camera 630. The broadcast camera 610, the auxiliary camera 630, and the computing device 650 may be portions of the integrated broadcast/auxiliary camera system 100, 200, 300, or 400. The camera interface unit 658 may be coupled to the broadcast camera 610 and the auxiliary camera 630 via a network which may be a local area network, via one or more buses such as a USB bus, a PCI bus, a PCI Express bus, or other parallel or serial data bus, or via one or more direct wired or wireless connections. The camera interface unit 658 may be coupled to the broadcast camera 610 and the auxiliary camera 630 via a combination of one or more of direct connections, network connections, and bus connections.

The processes, functionality and features of the computing device 650 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 650 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 652 and others by other devices.

Description of Processes

Figure 7:
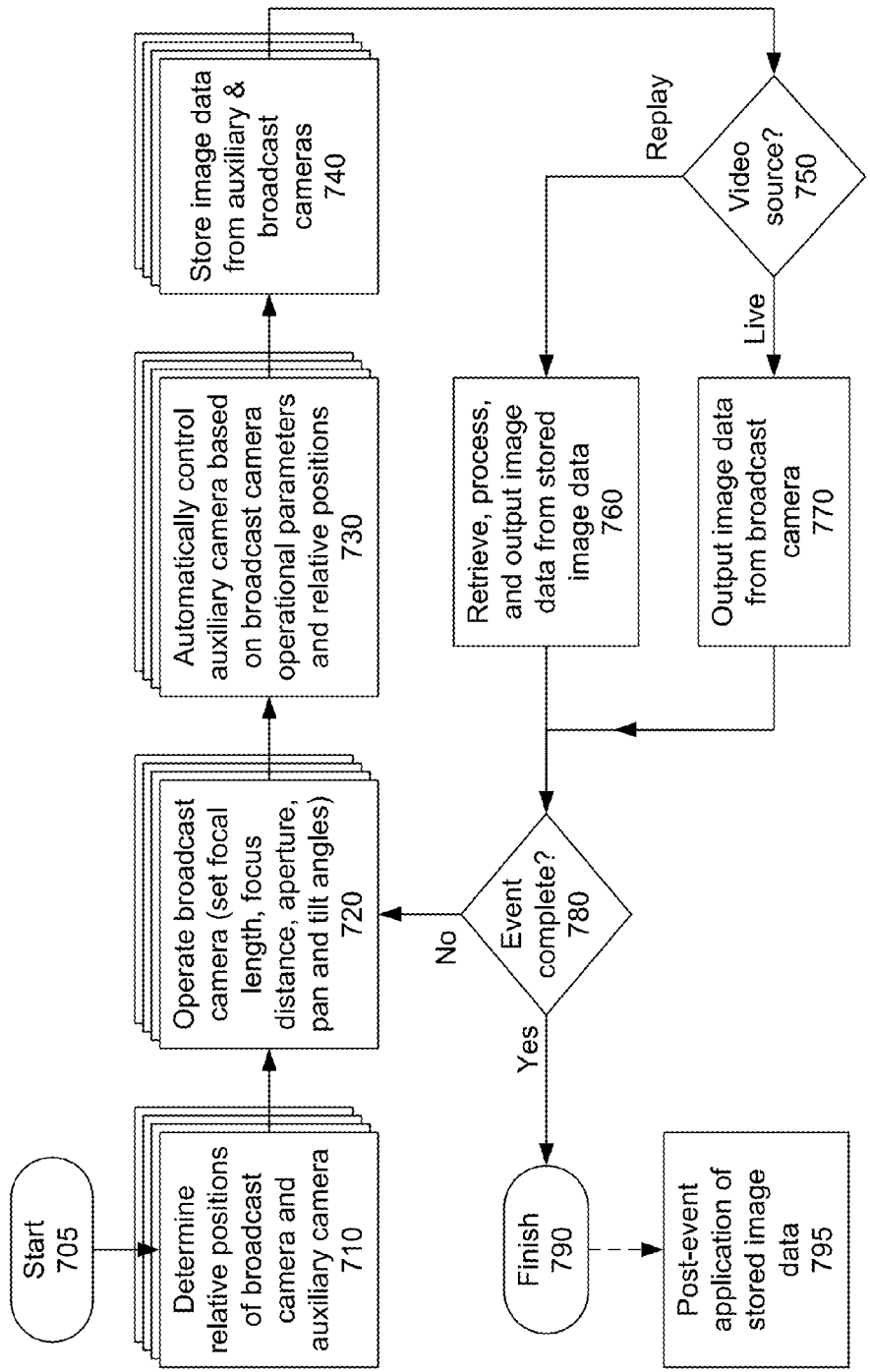
FIG. 7 is a flow chart of a process for operating an integrated broadcast and auxiliary camera system.

FIG. 7 is a flow chart of an exemplary process 700 for operating an integrated broadcast/auxiliary camera system such as the integrated broadcast/auxiliary camera systems 100, 200, 300, and 400. FIG. 7 is a flow chart of a process for recording an "event", which may be an extended athletic competition, a theatrical production, or a concert or other musical production. An "event" may also be a single scene or take in a television or cinematic production. The process 700 may start at 705 after the integrated broadcast/auxiliary camera system is disposed in a venue where the event to be captured will take place. The process 700 may finish at 790 after the event has been completed. Video data captured using the process 700 may survive the completion of the process for use at 795 in post-event applications such as highlight films, news reports, theatrical products, and other applications.

The process 700 is shown as a series of sequential actions for ease of description. However, the actions from 720 to 780 may be performed essentially simultaneously, continuously, and in near real time for the duration of the event. Within this patent, the phrase "near-real time" means in real time except for processing delays that are very short compared with temporal events in the scene being captured.

The process 700 captures images of an event using at least one integrated broadcast/auxiliary camera system. Actual events may be captured using a plurality of cameras including multiple integrated broadcast/auxiliary camera systems and stand-alone cameras. The actions from 710 to 740 may be performed independently and in parallel for each integrated broadcast/auxiliary camera system. The actions from 750 to 780 may be performed for all of the cameras collectively.

At 710, a position of the auxiliary camera may be determined relative to a position of the broadcast camera. When the broadcast and auxiliary cameras are attached to each other, as shown in FIG. 1, or at least mounted to a common pan/tilt platform, the cameras may be separated by a small distance along a single axis. When the broadcast and auxiliary cameras are mounted separately, as shown in FIG. 2, an offset between the cameras may be determined along three orthogonal axes. For example, the pan and tilt mechanism of the broadcast camera may be used, by pointing the broadcast camera at the auxiliary camera, to determine the angular orientation of a vector connecting the two cameras. A distance between the cameras may be measured directly (e.g. using a tape measure) along this vector. The pan and tilt angles and the measured distance define the location of the auxiliary camera with respect to the broadcast camera in a polar coordinate system. The polar coordinates may be converted to rectangular coordinates using known techniques to define the offset between the two cameras along the three orthogonal axes.

At 720, an operator, such as a cameraman, may operate the broadcast camera. To operate the camera, the operator may view the image captured by the camera on a monitor display and take action to control one or more operating parameters of the broadcast camera. The controlled operating parameters may include lens focus distance, lens focal length, lens aperture, camera pan angle, and/or camera tilt angle. The cameraman may take action to control the operating parameters directly (i.e. with his hands upon the camera) or may activate controls on a control panel collocated with or remote from the broadcast camera.

At 730, the auxiliary camera may be automatically operated based upon the operating parameters of the broadcast camera as set by the operator at 720 and the relative positions of the broadcast and auxiliary cameras as determined at 710. The auxiliary camera may be operated such that the auxiliary camera is approximately focused on the same point in the scene as the broadcast camera. The auxiliary camera may also be operated such that the scene captured by the auxiliary camera is approximately concentric with the scene captured by the broadcast camera. In this context, "approximately centric" means the offset between the centers of the scenes is small compared to the extent of the scenes. The actions taken at 730 to automatically operate the auxiliary camera depend on whether the broadcast and auxiliary cameras are attached as shown in FIG. 1 or physical separate as shown in FIG. 2.

Figure 8:
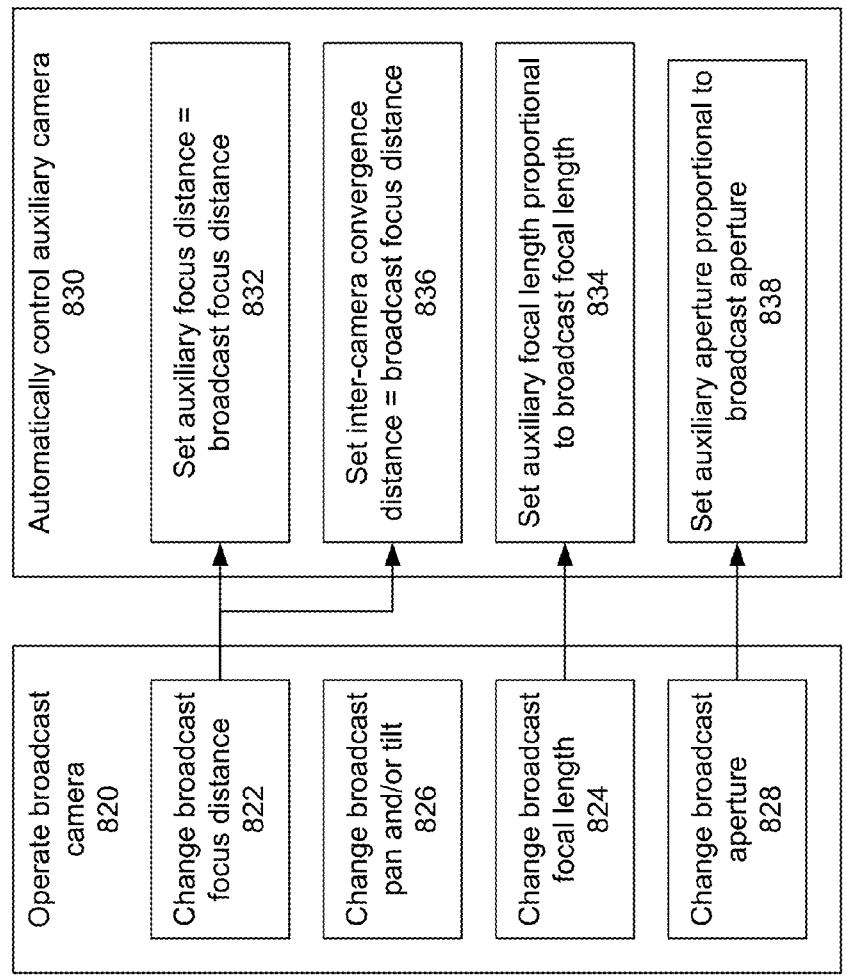
FIG. 8 is a flow chart of a portion of a process for operating an integrated broadcast and auxiliary camera system.

FIG. 8 is a flow chart of control actions for an integrated broadcast/auxiliary camera system where the broadcast and auxiliary camera systems are mounted in close proximity on a common pan/tilt platform. In this case, the auxiliary focus distance may be set equal to the broadcast focus distance. Further, when the operator changes the pan and/or tilt angles of the broadcast camera at 826, the pan and tilt angles of the auxiliary camera are inherently changed as well and no automatic response in required. When the operator changes the broadcast focus distance at 822, the auxiliary focus distance may be automatically set equal to the broadcast focus distance at 832. Further, an inter-camera convergence mechanism may be controlled to slightly adjust the pan and/or tilt angles of the auxiliary camera such that an inter-camera convergence distance is set equal to the broadcast focus distance at 836. When the operator changes the broadcast focal length at 824, the auxiliary focal length may be automatically set proportional to the broadcast focal length at 834, where "proportional" includes "equal" (i.e. proportional with a proportionality constant of 1).

When the operator changes the broadcast aperture at 828, the auxiliary aperture may be automatically set proportional to the broadcast aperture at 838. The actions at 828 and 838 may not occur for some integrated broadcast/auxiliary camera systems since the apertures of the broadcast camera and/or the auxiliary camera may be automatically and independently controlled. For example the aperture of each camera may be controlled in response to an internal light meter or in response to analysis of the images captured by the camera.

Figure 9:
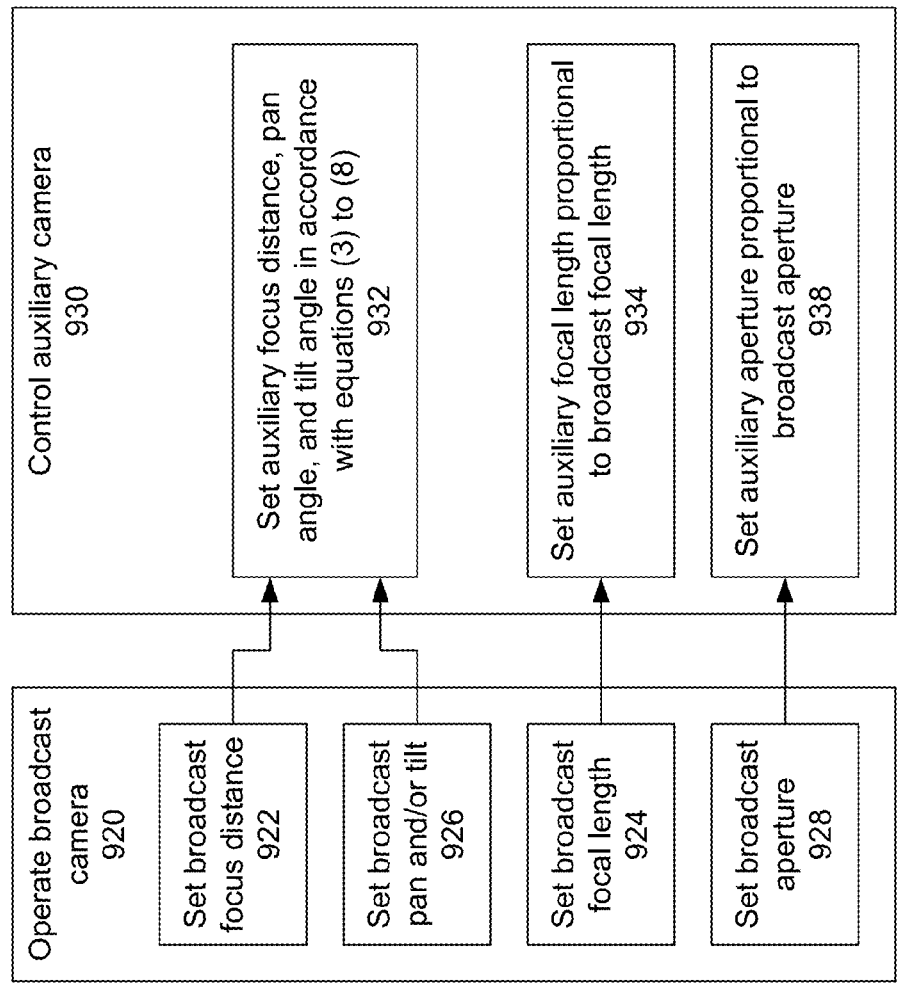
FIG. 9 is a flow chart of a portion of a process for operating an integrated broadcast and auxiliary camera system.

FIG. 9 is a flow chart of control actions for an integrated broadcast/auxiliary camera system where the broadcast and auxiliary camera systems located separately. In this case, as defined in equations (3)-(8), the pan angle, tilt angle, and focus distance of the auxiliary camera each depend upon the pan and tilt angles and focus distance of the broadcast camera. When the operator changes the broadcast focus distance at 922 or changes the broadcast pan and/or tilt angles at 926, the auxiliary focus distance, the auxiliary pan angle, and the auxiliary tilt angle may be automatically set at 932 in accordance with equations (3) to (8) (or analogous equations for other coordinate systems). When the operator changes the broadcast focal length at 924 or the broadcast aperture at 928, the automatic responses at 934 and 938 are the same as described in conjunction with FIG. 8.

Referring back to FIG. 7, at 740 video data from the auxiliary camera and, in most cases, the broadcast camera may be stored in a memory such as the video memory 572. At 750, an operator may decide whether live video (i.e. video data from one of the broadcast cameras) or replay video (i.e. video data retrieved from memory) will be output for broadcasting.

When a decision is made at 750 to output live video, video data from a selected broadcast camera may be output at 770. The video data from the selected broadcast camera may be processed before being output. For example, processes that may be performed on the video data may include color correction, gamma, correction, level correction, and other processes. Video data from a HDTV-compatible broadcast camera may be converted to a standard-definition format and output as both HDTV and SDTV video data.

When a decision is made at 750 to output replay video, previously stored video data may be retrieved from memory and output at 760. The video data retrieved from memory may be processed or otherwise manipulated before being output. For example, video data from a high speed camera may be replayed at a standard frame rate to provide slow motion replay. Digital pan and zoom techniques may be used to select a portion of video data from a very high resolution auxiliary camera to provide a highly detailed replay of a portion of a scene. Video data from two or more broadcast or auxiliary cameras may be superimposed, combined in a split-screen format, or otherwise combined. Other processes that may be performed on the video data may include color correction, gamma, correction, level correction, and other processes. HDTV video data broadcast camera may be converted to a standard-definition format and output as both HDTV and SDTV video data.

At 780, a determination may be made if the event being captured is complete. If the event continues, the process 700 may repeat continuously from 720. If the event is complete, the process 700 may finish as 790. The video data stored at 740 may survive the process 700 and may be used at 795 for post-event applications.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An integrated broadcast/auxiliary camera system, comprising:
    a broadcast camera including a first lens to capture a first image of a scene, wherein operational parameters of the broadcast camera including a focus distance of the first lens, a focal length of the first lens, a pan angle and a tilt angle are operator controlled;
    an auxiliary camera affixed to the broadcast camera, the auxiliary camera including a second lens, the auxiliary camera to capture a second image of the scene different from the first image;
    a controller configured to automatically set a focus distance of the second lens equal to the focus distance of the first lens.

2. The integrated broadcast/auxiliary camera system of claim 1, wherein
    the broadcast camera and the auxiliary camera are two-dimensional cameras, and
    the second image differs from the first image in at least one of field of view, resolution, and frame rate.

3. The integrated broadcast/auxiliary camera system of claim 1, further comprising:
    a memory to store video data from the auxiliary camera; and
    a replay processor to retrieve and process all or a portion of the stored video data.

4. The integrated broadcast/auxiliary camera system of claim 1, wherein
the controller is configured to automatically set an inter-camera convergence angle such that an axis of the first lens and an axis of the second lens intersect at the focus distance of the first lens.

5. The integrated broadcast/auxiliary camera system of claim 1, wherein
the controller is configured to automatically set a focal length of the second lens proportional to the focal length of the first lens.

6. The integrated broadcast/auxiliary camera system of claim 3, wherein
the auxiliary camera has a substantially higher frame rate than a standard frame rate of the broadcast camera, and
the replay processor replays the retrieved video data at the standard frame rate to provide slow motion replay.

7. The integrated broadcast/auxiliary camera system of claim 3, wherein
the auxiliary camera has a substantially higher resolution than a standard resolution of the broadcast camera, and
the replay processor uses digital pan and zoom to select a portion of the retrieved video data for replay at the standard resolution.

8. A method for operating an integrated camera including a broadcast camera including a first lens affixed to an auxiliary camera including a second lens, the method comprising:
an operator controlling operation parameters of the broadcast camera including a focus distance of the first lens, a focal length of the first lens, a pan angle and a tilt angle;
capturing a first image of a scene with the broadcast camera;
automatically setting a focus distance of the second lens equal to the focus distance of the first lens; and
capturing a second image of the scene with the auxiliary camera, the second image different from the first image.

9. The method for operating an integrated camera of claim 8, wherein
the broadcast camera and the auxiliary camera are two-dimensional cameras, and
the second image differs from the first image in at least one of field of view, resolution, and frame rate.

10. The method for operating an integrated camera of claim 8, further comprising:
storing video data from the auxiliary camera in a memory; and
replaying a portion of the stored video data.

11. The method for operating an integrated camera of claim 8, further comprising:
automatically setting an inter-camera convergence angle such that an optical axis of the first lens and an optical axis of the second lens intersect at the focus distance of the first lens.

12. The method for operating an integrated camera of claim 8, further comprising:
automatically setting a focal length of the second lens proportional to the focal length of the first lens.

13. The method for operating an integrated camera of claim 10, wherein
the auxiliary camera has a substantially higher frame rate than a standard frame rate of the broadcast camera, and
replaying comprises outputting the portion of the stored video data at the standard frame rate to provide slow motion replay.

14. The method for operating an integrated camera of claim 10, wherein
the auxiliary camera has a substantially higher resolution than a standard resolution of the broadcast camera, and
replaying comprises using digital pan and zoom to select the portion of the stored video data to output at the standard resolution.

* * * * *